(12) United States Patent
Dardick et al.

(10) Patent No.: US 9,163,900 B2
(45) Date of Patent: Oct. 20, 2015

(54) OPEN CHAMBER AMMUNITION

(71) Applicant: OPEN CHAMBER SYSTEMS, LLC, Enola, PA (US)

(72) Inventors: David Scott Dardick, Camp Hill, PA (US); Steven Michael Dardick, Mechanicsburg, PA (US); Thomas Michael Dardick, Enola, PA (US)

(73) Assignee: OPEN CHAMBER SYSTEMS, LLC, Enola, PA (US)

( * ) Notice: Subject to any disclaimer, the term of this patent is extended or adjusted under 35 U.S.C. 154(b) by 52 days.

(21) Appl. No.: 14/027,607

(22) Filed: Sep. 16, 2013

(65) Prior Publication Data

US 2014/0076190 A1    Mar. 20, 2014

Related U.S. Application Data

(60) Provisional application No. 61/701,853, filed on Sep. 17, 2012, provisional application No. 61/701,862, filed on Sep. 17, 2012.

(51) Int. Cl.
| | | |
|---|---|---|
| *F42B 10/00* | (2006.01) | |
| *F41C 3/14* | (2006.01) | |
| *B23K 15/00* | (2006.01) | |
| *F42B 12/78* | (2006.01) | |

(Continued)

(52) U.S. Cl.
CPC ............... *F41C 3/14* (2013.01); *B23K 15/0006* (2013.01); *F42B 5/025* (2013.01); *F42B 12/78* (2013.01); *F42B 5/30* (2013.01)

(58) Field of Classification Search
CPC ........................................... F41C 3/14
USPC ......... 102/515, 434, 444, 436, 531, 502, 458, 102/439
See application file for complete search history.

(56) References Cited

U.S. PATENT DOCUMENTS

| | | | |
|---|---|---|---|
| 2,847,784 A | 8/1958 | Dardick | |
| 2,865,126 A | 12/1958 | Dardick | |
| 2,983,223 A | 5/1961 | Dardick | |

(Continued)

FOREIGN PATENT DOCUMENTS

| | | |
|---|---|---|
| CA | 919351 A2 | 1/1973 |
| CA | 950754 A2 | 7/1974 |
| CA | 1093870 A1 | 1/1981 |

OTHER PUBLICATIONS

Notification of Transmittal of the International Search Report and the Written Opinion of the International Searching Authority from corresponding PCT/US2013/059903 dated Jul. 16, 2014.

(Continued)

*Primary Examiner* — Michelle R Clement
(74) *Attorney, Agent, or Firm* — Lando & Anastasi LLP

(57) ABSTRACT

Aspects described herein relate to an ammunition round for an open chamber gun mechanism is provided, the round comprising a housing having a triangular shaped cross section and a central longitudinal axis, the housing including at least one projectile positioned along the central longitudinal axis, a propellant positioned behind the at least one projectile along the central longitudinal axis, a first sealed end located at a first end of the housing nearest the propellant, and a second sealed end positioned at a second end of the housing in front of the projectile, wherein the second sealed end is configured to become unsealed after firing of the projectile.

20 Claims, 8 Drawing Sheets

(51) Int. Cl.
*F42B 5/02* (2006.01)
*F42B 5/30* (2006.01)

(56) References Cited

U.S. PATENT DOCUMENTS

| | | | |
|---|---|---|---|
| 3,041,939 A | 7/1962 | Dardick | |
| 3,046,890 A | 7/1962 | Dardick | |
| 3,434,380 A | 3/1969 | Dardick | |
| 3,446,111 A * | 5/1969 | Dardick | 89/1.7 |
| 3,467,276 A | 9/1969 | Dardick | |
| 3,492,913 A | 2/1970 | Barnard | |
| 3,496,827 A | 2/1970 | Dardick | |
| 3,501,998 A | 3/1970 | Dardick | |
| 3,503,300 A | 3/1970 | Dardick | |
| 3,507,219 A | 4/1970 | Dardick | |
| 3,514,026 A | 5/1970 | Dardick | |
| 3,568,599 A * | 3/1971 | Dardick | 102/434 |
| 3,572,248 A | 3/1971 | Dardick | |
| 3,768,412 A | 10/1973 | Dardick | |
| 3,855,931 A * | 12/1974 | Dardick | 102/436 |
| 4,004,642 A | 1/1977 | Dardick | |
| 4,026,212 A * | 5/1977 | Dardick | 102/531 |
| 4,091,730 A * | 5/1978 | Dardick | 102/531 |
| 4,204,473 A | 5/1980 | Dardick | |
| 4,337,911 A * | 7/1982 | Flatau | 244/3.1 |
| 4,474,250 A | 10/1984 | Dardick | |
| 4,582,147 A | 4/1986 | Dardick | |
| 4,748,892 A | 6/1988 | Dardick et al. | |
| 4,831,914 A | 5/1989 | Dardick et al. | |
| 4,836,082 A * | 6/1989 | Dardick | 89/1.41 |
| 5,067,408 A * | 11/1991 | Martwick | 102/434 |
| 6,546,874 B2 * | 4/2003 | Vasel et al. | 102/444 |
| 7,194,943 B2 * | 3/2007 | O'Dwyer | 89/28.05 |
| 7,526,998 B2 * | 5/2009 | Vasel et al. | 102/502 |
| 7,908,972 B2 * | 3/2011 | Brunn | 102/458 |
| 2010/0078004 A1 * | 4/2010 | Oleynik et al. | 124/73 |
| 2014/0230680 A1 * | 8/2014 | Meller | 102/439 |

OTHER PUBLICATIONS

Office Action from corresponding U.S. Appl. No. 14/027,600 mailed May 20, 2014.

* cited by examiner

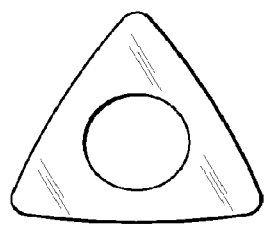
FIG. 7
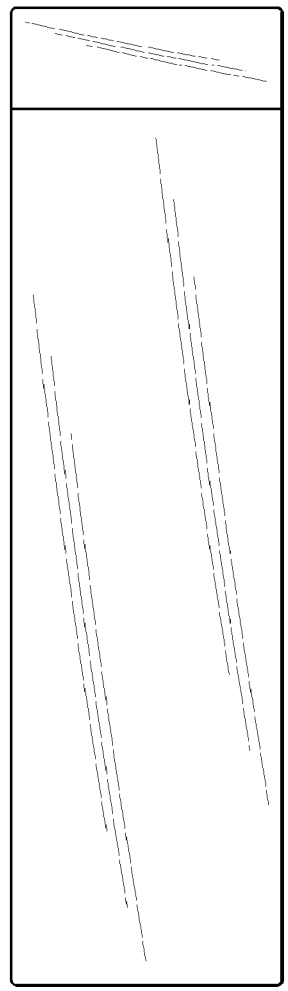 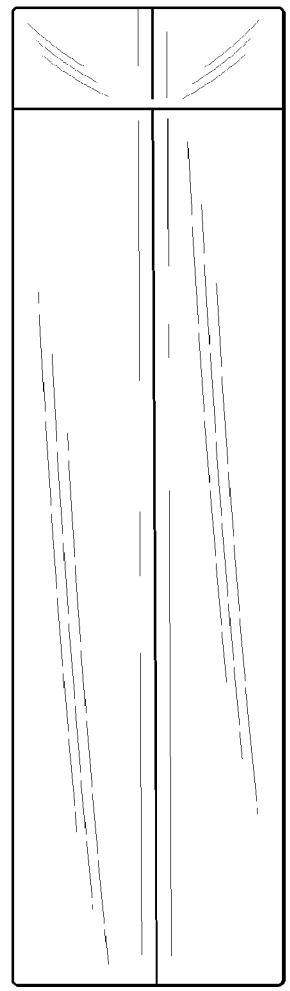
FIG. 8  FIG. 9

OPEN CHAMBER AMMUNITION

RELATED APPLICATION

This application claims priority under 35 U.S.C. §119(e) to U.S. Provisional Application No. 61/701,853 entitled "OPEN CHAMBER MECHANISM AND AMMUNITION," filed Sep. 17, 2012, and to U.S. Provisional Application No. 61/701,862 entitled "OPEN CHAMBER MECHANISM AND AMMUNITION," filed Sep. 17, 2012, each of which is hereby incorporated by reference in its entirety for all purposes.

BACKGROUND OF THE DISCLOSURE

1. Field of the Invention

Aspects of the present invention relate generally to open chamber mechanisms.

2. Discussion of Related Art

One common type of open chamber firearm is an open chamber gun with a rotatable cylinder (i.e., a revolver with open chambers). Such an open chamber revolver typically includes a cylinder with chambers that have their exterior portions removed, forming open (i.e., open to the exterior of the cylinder) "U" shaped chambers rather than closed "O" shaped chambers found on standard revolvers. Such open chambers in the cylinder allow cartridges to be inserted from the side of the cylinder, rather than from the front or rear, and may allow the cylinder to be rapidly loaded from a magazine. The cylinder of an open chamber gun is centered in a strong frame, so that when ready to fire, the cartridge about to be fired rests against one side of the frame (e.g., via an open chamber), and the opposite side of the cylinder rests against the opposite side of the frame. Upon firing, force is applied to the frame from the cartridge on one side and the cylinder from the other.

Unlike a traditional firearms cartridge, whose case is roughly cylindrical, an open chamber firearm may require an inserted cartridge to be otherwise. For example, since the cartridge contacts the frame upon firing, one side of the cartridge may match the cylinder's exterior (i.e., may match the curvature of the frame) to seal the cartridge against the frame upon firing, while the other side of the cartridge may match the "U" shape of the cylinder.

SUMMARY

According to one aspect of the present invention, improved methods and elements are provided that may be used with open chamber guns.

According to one embodiment of the present invention, an expandable insert is provided that allows for a symmetrical round to be inserted into an open chamber firearm so that jamming is reduced and loading of ammunition is simplified and made more reliable. In addition, the expandable insert minimizes the amount of stress transferred to the base of the cylinder cavity (for example, as shown in FIG. 3).

In one embodiment, the insert includes a cylindrical shape on one side that engages the cylinder cavity to distribute stress evenly, and includes on opposite side that is shaped to receive a symmetrical round (e.g., a triangular shaped round). The expandable area is attached to the cylinder cavity nearest an opening edge. Upon firing, the insert is permitted to deflect and fill the clearances between the insert and the cylinder base so as to reduce stresses on the cavity surface material. In one embodiment, electron beam welding is used to attach the upper portion of the insert near the opening edge of the cylinder cavity. In one embodiment, a gap may be provided between the insert and the interior edge of the open chamber that permits an expansion of the insert when subject to high pressures associated with firing. In one embodiment, interior material may be manufactured of high-strength steel (e.g., 100,000 psi or stronger tensile strength steel).

According to another embodiment, a symmetrical corner radius is utilized for the cartridge case for use with an open chamber gun. In particular, the symmetrical round is triangular in nature and provides more efficient storing, stacking and loading of the ammunition for use in open chamber guns. According to another embodiment, it is appreciated that there may be a leakage problem associated with using a plastic cartridge case assembled in multiple pieces for use in an open chamber gun design. In particular, there may be gun gas leakage upon firing along the forward end of the projectile housing near the barrel and at the rear of the round where the primer is housed within the open chamber. In one embodiment, a seal is provided near the barrel end of the casing that stops the leakage of discharge gases along the open chamber cylinder. However, it should be appreciated that the seal can be provided wherever a joint is formed between multiple pieces of the cartridge case.

According to another embodiment, an open chamber casing is provided that is sealed which permits the ammunition to be used within a variety of environmental conditions. For instance, a projectile (e.g., a bullet) and its propellant (e.g., gunpowder, cordite, etc.) may be sealed within a leak proof container. Prior open chamber casings would not provide adequate sealing, and therefore could not be used in various environments. For instance, such casings may be used in environments where water, sand, or other external materials could corrupt the casing or its contents. According to another embodiment, it is appreciated that a cam index drive may be used to increase the performance of an open chamber gun mechanism. In particular, a cam mechanism may be used to reduce the power required to turn the cylinder, and more notably, to create a dwell time when the round is in firing position. According to one embodiment, the mechanism may include a cam index drive, a speed reducer, and a motor.

According to one aspect of the present invention, an open chamber gun mechanism is provided comprising a frame and a cylinder assembly that forms an open chamber positioned for rotation within the frame, said open chamber including an insert positioned within the open chamber, the insert forming an expandable region between the open chamber and cylinder. According to one embodiment, the insert is configured to deflect into the expandable region upon firing the open chamber gun mechanism. According to another embodiment, the insert is manufactured of high tensile strength steel. According to yet another embodiment, the insert is welded to an opening portion of the open chamber.

In another embodiment, the insert is attached using an electron beam weld. According to another embodiment of the present invention, the insert includes an insert surface shaped to hold a symmetrical triangular-shaped round. According to another embodiment of the present invention, the open chamber gun mechanism further comprises a cam index drive that is adapted to execute a dwell time after a firing of the open chamber gun mechanism. According to another embodiment of the present invention, the dwell time is determined based on a reduction in chamber pressure.

According to another embodiment of the present invention, the open chamber gun mechanism is used in a non-lethal application. According to another embodiment of the present invention, the insert includes, on one side that is in contact with a rounded surface of the open chamber, a rounded surface that is capable of distributing forces across the rounded surface of the open chamber. According to another embodiment of the present invention, the dwell time is adjusted to permit decreased force required for rotating the cylinder.

According to another aspect of the present invention, a method for constructing an open chamber gun mechanism is provided, the method comprising rotatably coupling a cylinder assembly to a frame, the cylinder assembly forming at least one open chamber positioned for rotation within the frame, and welding an insert within the at least one open chamber to form an expandable region between the open chamber and the cylinder assembly.

According to one embodiment, the insert is configured to deflect into the expandable region upon firing the open chamber gun mechanism. In another embodiment, welding an insert includes welding an insert manufactured of high tensile strength steel. In one embodiment, welding an insert within the at least one open chamber includes welding an insert to an opening portion of the at least one open chamber. In another embodiment, welding an insert to an opening portion of the at least one open chamber includes attaching the insert to the opening portion of the open chamber with an electron beam weld.

According to another embodiment, the insert includes an insert surface shaped to hold a symmetrical triangular-shaped round. In another embodiment, the method further comprises coupling a cam index drive to the cylinder assembly via a shaft, the cam index drive configured to execute a dwell time after a firing of the open chamber gun mechanism. In one embodiment, the cam index drive is further configured to determine the dwell time based on a reduction in chamber pressure.

Another aspect of the present invention is directed to a method for providing an open chamber gun mechanism, the method comprising providing a frame, providing a cylinder assembly that forms an open chamber positioned for rotation within the frame, and providing an insert positioned within the open chamber, the insert forming an expandable region between the open chamber and the cylinder assembly.

According to another aspect of the present invention, an ammunition round for an open chamber gun mechanism is provided, the round comprising a housing having a triangular shaped cross section and a central longitudinal axis, the housing including at least one projectile positioned along the central longitudinal axis, a propellant positioned behind the at least one projectile along the central longitudinal axis, a first sealed end located at a first end of the housing nearest the propellant, and a second sealed end positioned at a second end of the housing in front of the projectile, wherein the second sealed end is configured to become unsealed after firing of the projectile.

According to one embodiment, the housing is manufactured using a polycarbonate material. According to another embodiment of the present invention, a firing element is positioned within the first sealed end. According to another embodiment, the round includes a sealing element disposed around a circumference of the triangular shaped cross section, and is disposed to seal elements along the longitudinal axis of an accepting open cylinder of the ammunition round.

According to another embodiment, the round is used within a non-lethal open chamber gun mechanism. According to another embodiment, the sealing element is disposed between a plurality of elements that comprise the ammunition round. According to another embodiment, the triangular shaped cross section includes a symmetrical corner radius at each one of a plurality of edges of the triangular shaped cross section.

According to one embodiment, the second sealed end includes a cover that is attached to the second end of the housing so that, upon firing of the projectile, the projectile exits the housing via the cover. In one embodiment, the cover has a thickness configured not to impede a path of the projectile upon firing of the projectile. In another embodiment, the housing is manufactured using a polycarbonate material and the cover is manufactured using the polycarbonate material. In one embodiment, the cover is configured to shield the projectile and the propellant from being exposed to elements external of the housing. In one embodiment, the cover is attached to the second end of the housing with a relatively thin watertight seal.

According to another aspect of the present invention, a method for providing ammunition for an open chamber gun is provided, the method comprising providing at least one housing having a triangular shaped cross section and a central longitudinal axis, providing at least one projectile along the central longitudinal axis of the at least one housing, providing a propellant between a first end of the projectile and a first sealed end of the at least one housing; and providing a second sealed end of the at least one housing adjacent a second end of the projectile, the second sealed end configured to become unsealed upon ignition of the propellant.

According to one embodiment, providing at least one housing includes providing at least one housing manufactured with a polycarbonate material. In one embodiment, providing a second sealed end includes providing a second sealed end including a cover attached to the at least one housing so that, upon ignition of the propellant, the projectile exits the at least one housing via the cover. In one embodiment, providing a second sealed end including a cover includes providing a second sealed end including a cover having a thickness configured not to impede a path of the projectile upon ignition of the propellant. In another embodiment, providing at least one housing includes providing at least one housing manufactured with a polycarbonate material and wherein providing a second sealed end including a cover includes providing a second sealed end including a cover manufactured with the polycarbonate material.

According to another embodiment, the method further comprises providing a firing element positioned within the first sealed end of the at least one housing. In one embodiment, the method further comprises providing a sealing element disposed around a circumference of the triangular shaped cross section and to seal elements along the longitudinal axis of an accepting open cylinder of the ammunition round. In one embodiment, providing a sealing element including providing a sealing element disposed between a plurality of elements that comprise the ammunition round. In another embodiment, providing at least one housing having a triangular shaped cross section includes providing at least one housing having a triangular shaped cross section that includes a symmetrical corner radius at each one of a plurality of edges of the triangular shaped cross section.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7 shows a top view of a casing according to one embodiment of the present invention;

FIG. 8 shows a side view of a casing according to one embodiment of the present invention; and FIG. 9 shows an end view of a casing according to one embodiment of the present invention.

DETAILED DESCRIPTION OF THE INVENTION

Figure 1:
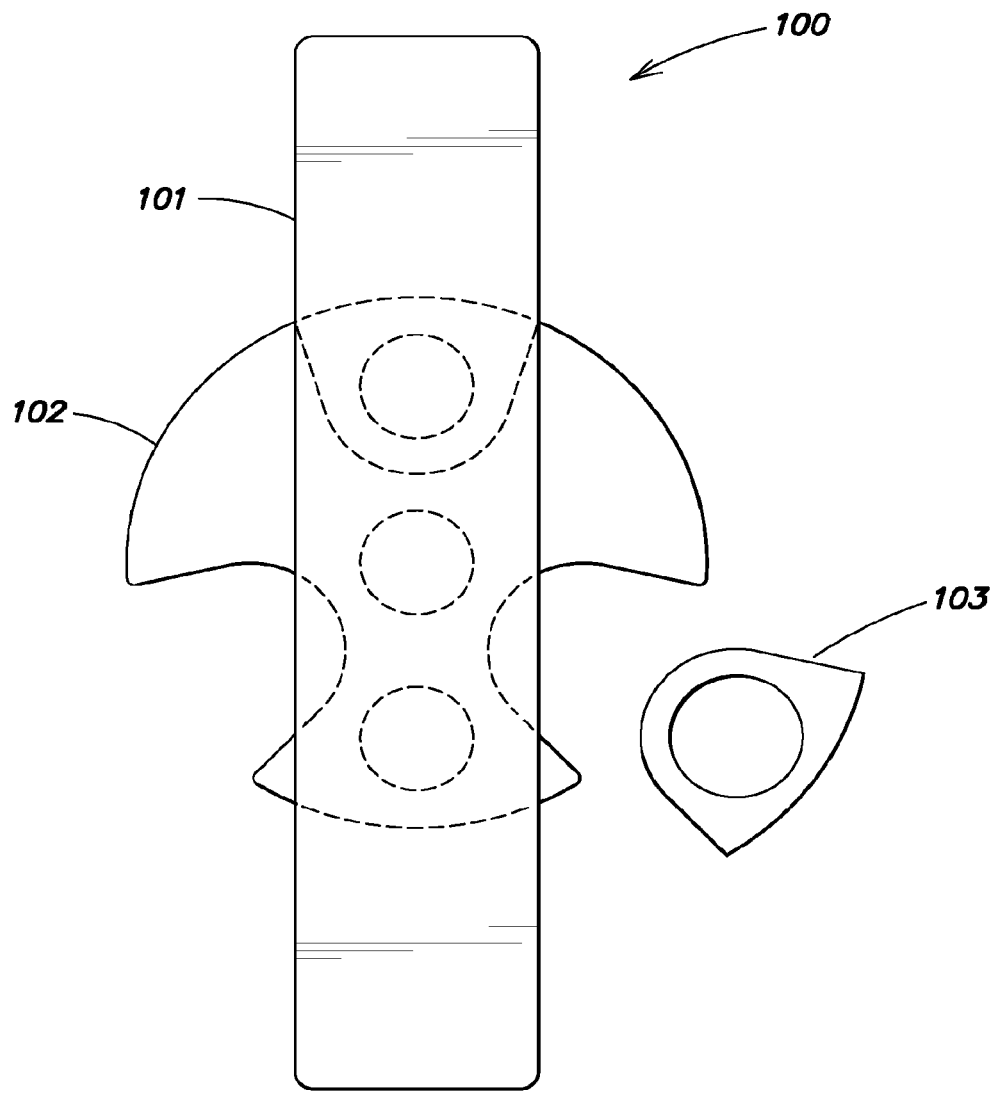
FIG. 1 shows a prior art open chamber mechanism.

Embodiments of the invention are not limited in their application to the details of construction and the arrangement of components set forth in the following description or illustrated in the drawings. Embodiments of the invention are capable of other embodiments and of being practiced or carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

As described above, open chamber revolvers may typically includes a cylinder with chambers that have their exterior portions removed, forming open (i.e., open to the exterior of the cylinder) "U" shaped chambers rather than closed "O" shaped chambers found on standard revolvers. For example, a conventional type of open chamber mechanism 100 is shown by way of example in FIG. 1. In particular, an open-chamber rotary cylinder 102 rotates about a shaft and positions ammunition (e.g., asymmetrical round 103) into battery position. It is appreciated that such asymmetrical rounds must be presented in the proper orientation to feed to the cylinder cavity, otherwise jamming and misfires may occur. Also, the asymmetrical round is rounded on one side to permit forces created during firing to be more equally distributed across the interior radius of an open chamber cylinder cavity.

However, it is appreciated that there are difficulties in the implementation of open-chamber guns and their ammunition. More particularly, it is recognized that automatic high performance open chamber guns generate high amounts of pressure that cause fatigue stresses in the base of the cylinder cavity and cause cracking leading to failure. Accordingly, embodiments described herein provide an expandable insert that minimizes the amount of stress transferred to the base of the cylinder cavity.

Figure 2:
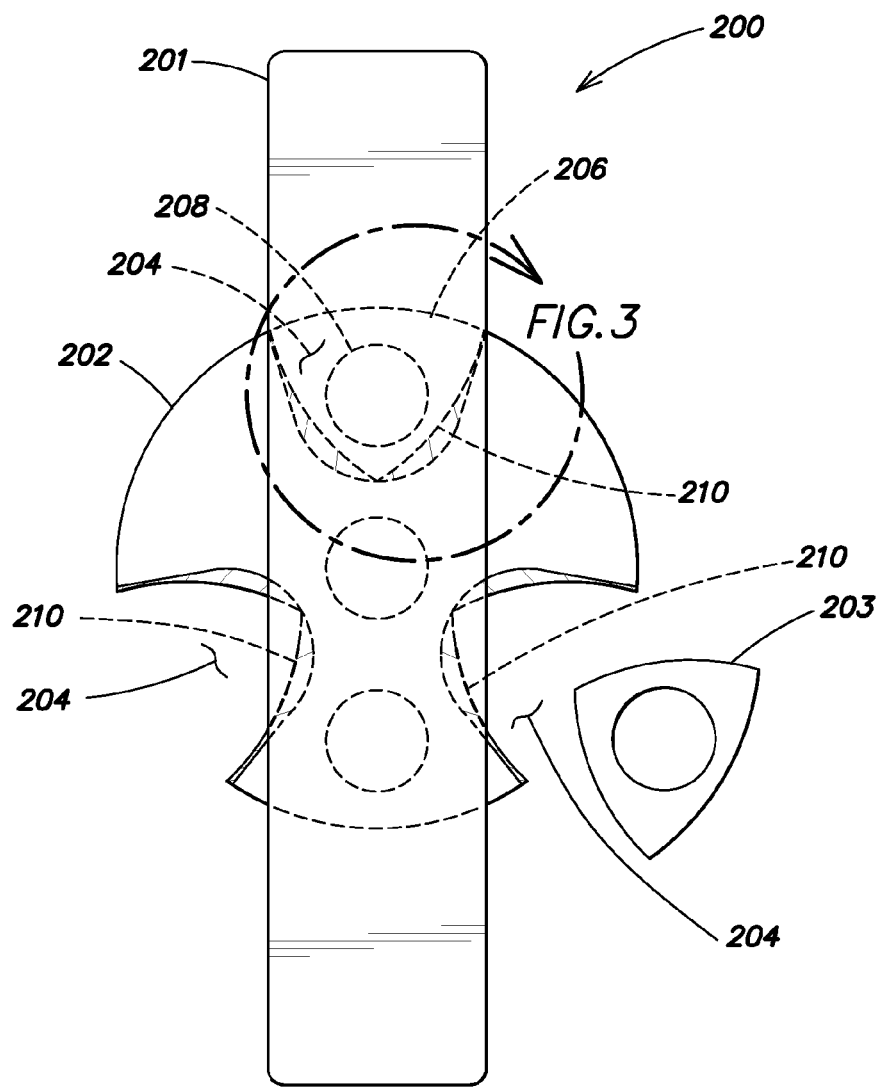
FIG. 2 shows an end view of an open chamber mechanism implementing various aspects of the present invention.

FIG. 2 shows an overview of an open chamber mechanism 200 implementing various aspects of the present invention. The open chamber mechanism 200 includes a rotary cylinder 202 having one or more cavities 204 and being mounted for rotation within a stationary frame 201 which serves to enclose and support a cylinder cavity 204 in battery position 206 to form the firing chamber 208. A pin at the front and a drive shaft at the rear, both contained within the frame, serve to support and rotate the cylinder about its axis.

Open chamber mechanism 200 may accept ammunition 203 received from the side into one or more of the cylinder cavities 204 and fired when the cylinder cavity 204 is rotated to the battery position 206. Ejection is accomplished on the opposite side upon the next rotation of the cylinder 202. Notably, cavities 204 of the rotary cylinder 202 may be modified to accept insert elements 210 within the cylinder cavities 204 to provide increased performance of the firing mechanism.

Figure 3:
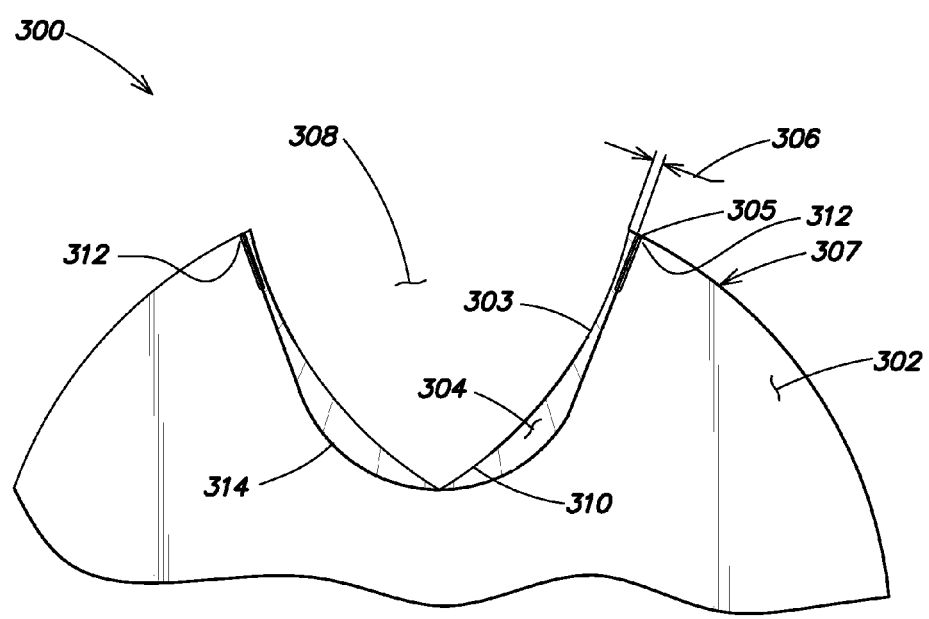
FIG. 3 shows a magnified end view of an improved chamber mechanism according to various aspects of the present invention.

A more detailed view of an open chamber mechanism 300 is shown by way of example in FIG. 3. In particular, cylinder 302 may include cavities 308. According to one embodiment, each cavity 308 includes an insert element 310 that is capable of accommodating a symmetrical round (e.g., casing 203 illustrated in FIG. 2) and also is capable of deflection under high stresses. Further, according to another embodiment, the cylinder 302 may be manufactured of a lower strength material, and therefore cost of the mechanism 300 may be reduced.

In one embodiment, a material such as high tensile steel may be electron beam welded within an open chamber (i.e., a cavity 308) to form an insert element 310. For example, according to one embodiment, high tensile steel is electron beam welded into a cavity 308, forming a surface 303 and expansion area 304. The material may be secured to opposite ends of the open chamber 308 via an attachment 305. For example, in one embodiment, an electron beam welding is used to secure the material 310 to the upper portions 312 of the open chamber 308. It should be appreciated that other methods of attachment may be used.

Between the material 310 and cylinder 302 there may be formed the expansion area 304 (e.g., a gap) which provides room for flexing of the surface 303 which usually occurs at and shortly after firing. According to one embodiment, such flexing of the surface 303 is permitted to preserve the cylinder 302 and to reduce stress fractures within the material comprising the cylinder 302. It is appreciated that such stress fractures are typically concentrated at the base 314 of the cavity 308. According to one embodiment, it is appreciated that after firing, the casing within the cavity 308 (e.g., casing 203 illustrated in FIG. 2) will expand, engaging the interior surface of the frame (e.g., frame 201 illustrated in FIG. 2) and the surface 303 of the open chamber 308. The insert 310 permits the casing (e.g., casing 203) to expand and thereby reduces the stress asserted on the cylinder 302.

In one embodiment, the width 306 of the expansion area 304 near the upper portion 312 of the open chamber (i.e., the distance 306 between the surface 303 of the insert 310 and the upper portion 312 of the open chamber) is approximately ⅛ of an inch thick. According to one embodiment, the internal curvature of the surface 303 of the insert 310 may be similar to the curvature of the outside radius 307 of the cylinder 302. According to another embodiment, the surface 303 of the insert 310 of the chamber 308 is shaped to accept a symmetrical triangular-shaped round such as round 203 shown by way of example in FIG. 2. It should be appreciated, however, that other thicknesses, curvatures, and round shapes may be used.

Accordingly, as discussed above, embodiments described herein provide an expandable insert that minimizes the amount of stress transferred to the base of the cylinder cavity and provides increased performance.

It is also appreciated that problems associated with open chamber cartridges may also arise during operation of an open chamber firearm (e.g., especially with automatic high performance open chamber guns). Accordingly, embodiments described herein, provide an improved cartridge for use with open chamber firearms.

Figures 4A, 4B:
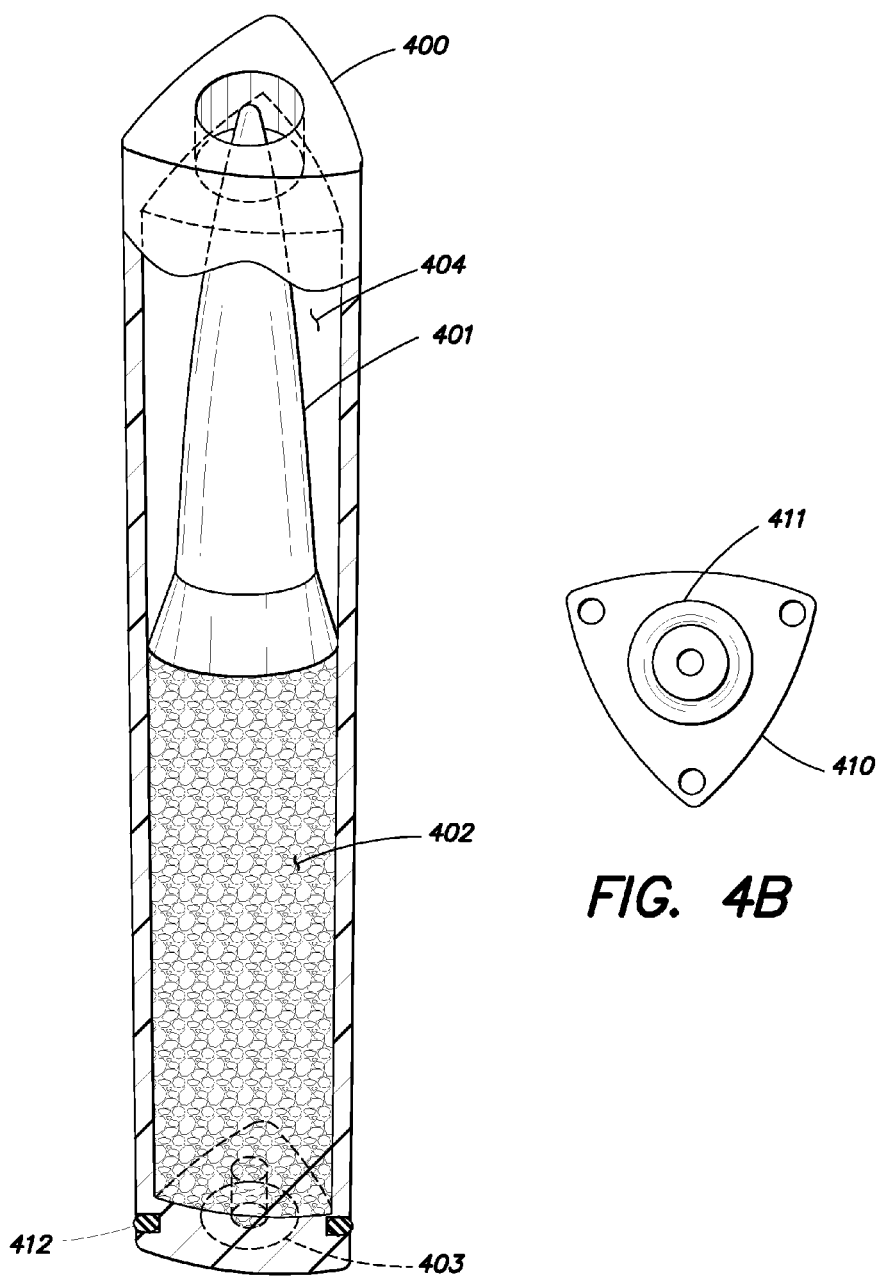
FIGS. 4A-4C show an improved cartridge casing according to various aspects of the present invention.
Figure 4C:
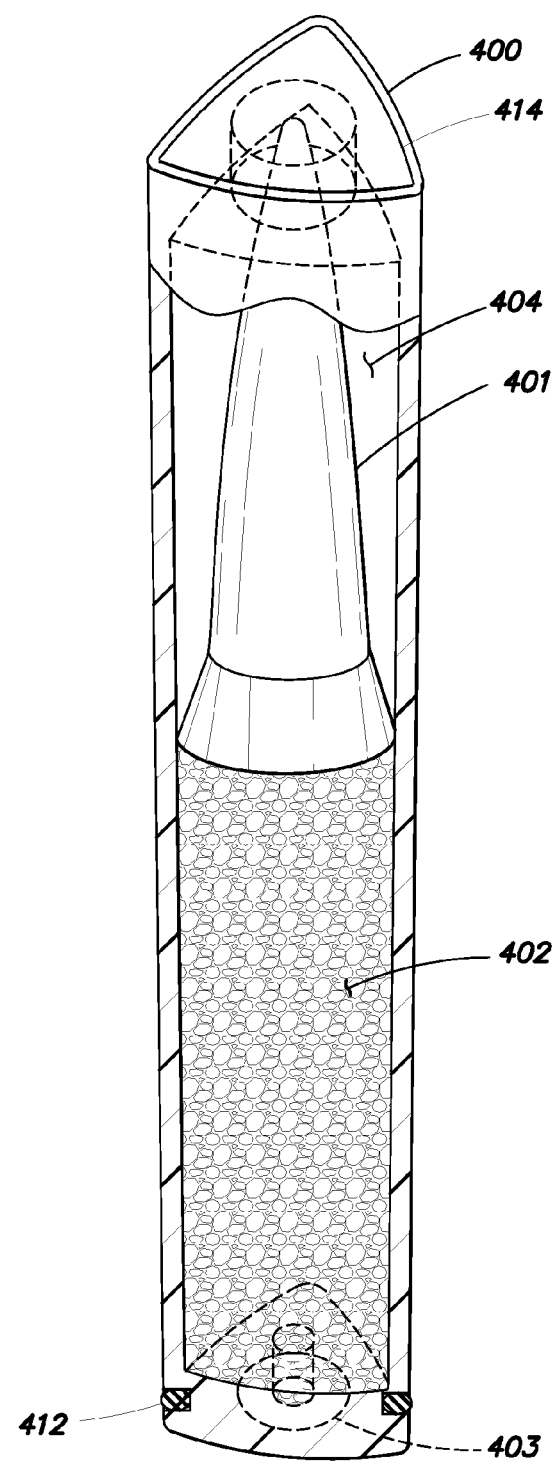

FIGS. 4A-4C show an improved cartridge casing according to various aspects of the present invention. As shown in FIG. 4A, a round having a casing 400 may be provided that can be fired using an open chamber mechanism (e.g., an open chamber mechanism as shown in FIGS. 2-3). Casing 400 may include a bullet 401 or other projectile type situated within the interior 404 of the casing 400. A propellant 402 may be located behind the bullet 401 and is situated to eject the bullet out of the casing 400 when fired. Casing 400 may also include a firing pin 403 that when struck ignites the propellant 402, causing expansion of the casing 400 and firing of the projectile 401 out of a barrel of the open chamber mechanism.

According to one embodiment, casing 400 is sealed and does not permit external materials within the casing housing 400. Such casings may be used in environments where water, sand, or other materials could corrupt the casing 400 or its contents. According to one embodiment, the casing 400 is manufactured using polycarbonate material that withstands high impact and pressures (e.g., Lexan, manufactured by Saudi Basic Industries Corporation (SABIC) Innovative Plastics of Riyadh, Saudi Arabia); however, in other embodiments, any appropriate material that can withstand high impact and pressures may be utilized. For example, according to some embodiments, the casing 400 may be manufactured using any high impact strength plastic (e.g., Radel, manufactured by Solvay S.A. of Brussels, Belgium or other types of polymers).

Because polycarbonate or other light materials may be used, the weight and cost of the ammunition may be reduced. Also, according to another embodiment, the material is chosen such that it is not susceptible to certain chemicals commonly utilized as cleaning solvents that may cause crazing or cracking of the polycarbonate material.

In one embodiment, the casing 400 may include one or more O-ring seals 412 positioned at either end of the casing 400 that engage interior portions of the open chamber (e.g., cavity 308 illustrated in FIG. 3. According to one embodiment, such a seal 412 may reduce the amount of discharge gases and other firing discharge that come in contact with interior surfaces of the open chamber. According to one embodiment, it is appreciated that such discharge materials may cause buildup and/or decreased performance in the open chamber mechanism. For instance, buildup may lead to misfiring, problems with loading/unloading of casings, among other issues. In one embodiment, such O-rings 412 may include material such as Radel, a polyphenylsulfone material, other sulfone material, or other suitable material. Such material may be chosen that is capable of operating at high temperature and pressures, and capable of forming an improved seal between the casing 400 and chamber surfaces.

According to another embodiment of the present invention, casing 400 may include a sealed end 414 through which the bullet or other projectile may exit. In other conventional implementations, it is appreciated that a casing may have an open end through which a bullet may exit. According to one embodiment, the casing 400 may include a closed cover 414 that shields the contents of the casing 400 from being exposed to external elements (e.g., as shown in FIG. 4C). In one embodiment, the casing cover 414 may be manufactured using a similar polycarbonate material used for the casing 400, but may be attached to the casing housing in such a manner that would permit the projectile 401 to be launched from the casing 400 via the cover 414. To this end, the cover 414 may include a thin amount of polycarbonate material that is affixed to the casing housing 400 using a relatively thin watertight seal. Thickness of the cover 414 may be chosen such that the cover 414 does not impede the path of the projectile when fired. It should be appreciated that other arrangements of the casing housing may be used.

FIG. 4B shows a bottom view of a casing 410 according to one embodiment of the present invention. As shown, casing 410 may have a symmetrical shape that permits ease in loading and unloading of casings from the open chamber cylinders. A firing element 411 (e.g., a percussion cap, primer or other ignition source) may be inserted into an open end of the casing 410 and may provide a watertight seal for the interior elements of the casing 410. The firing element 411, when struck, may ignite propellant within the casing 410 (e.g., propellant 402 as illustrated in FIG. 4A) and cause a projectile (e.g., projectile 401 as illustrated in FIG. 4A) to be expelled from the casing 410 via an opposite end of the casing 410.

Accordingly, as discussed above, embodiments described herein provide an improved cartridge for use with open chamber firearms.

It is also appreciated that problems associated with the power requirements and performance of an open chamber firearm may arise during use (e.g., especially with automatic high performance open chamber guns). Accordingly, embodiments described herein provide an improved cam mechanism for operating an open chamber mechanism.

Figure 5:
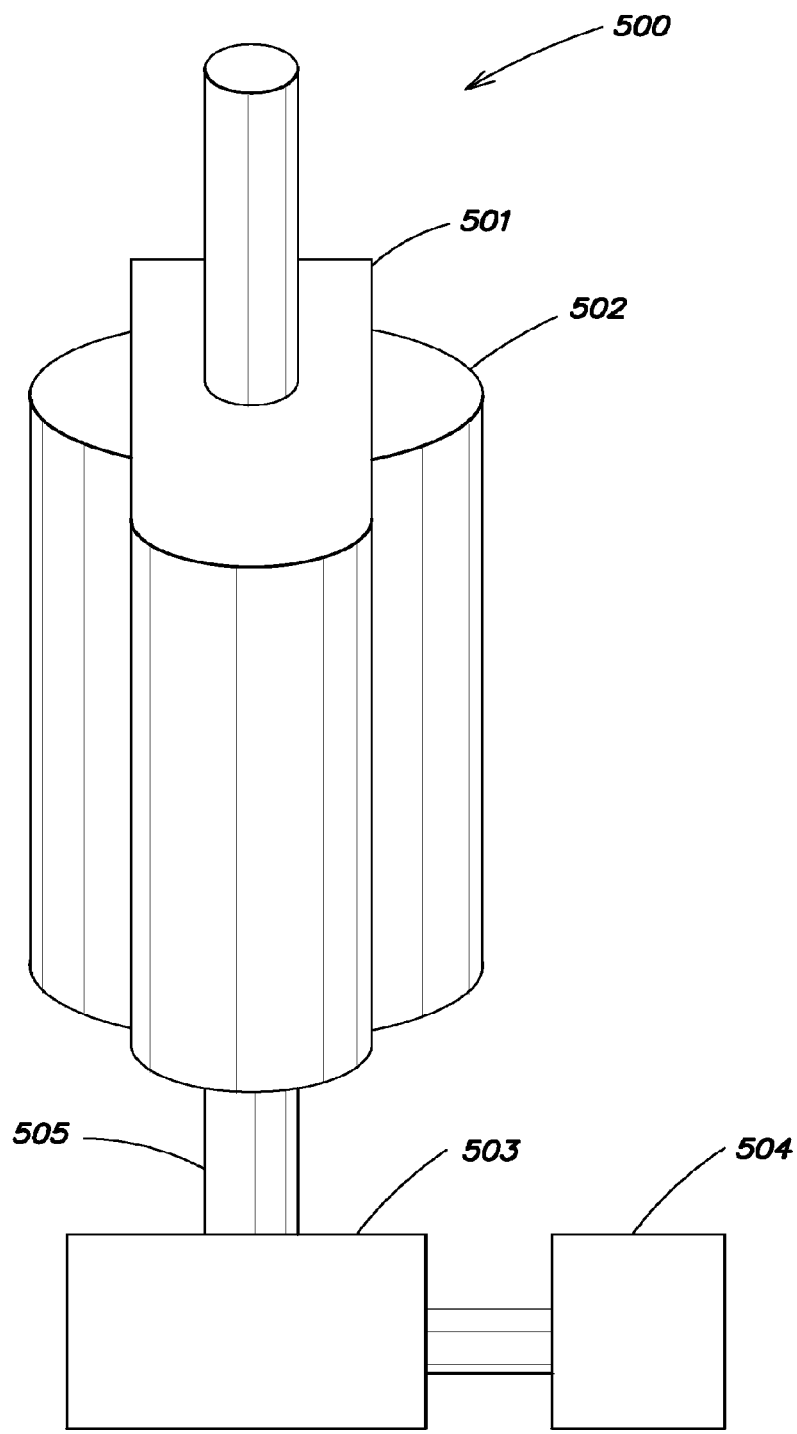
FIG. 5 shows an improved mechanism for operating an open chamber mechanism according to various embodiments of the present invention.

FIG. 5 shows an improved mechanism for operating an open chamber mechanism according to various embodiments of the present invention. It is appreciated that a cam index drive may be used to increase the performance of an open chamber gun mechanism. In particular, a cam mechanism may be used to reduce the power required to turn a cylinder of an open chamber gun mechanism (e.g., a cylinder 202 illustrated in FIG. 2). This may be accomplished, for example, by introducing a delay in the rotation of the shaft of the open chamber mechanism when firing pressures are highest (e.g., shortly after firing) such that the force required to rotate the shaft is reduced. For instance, the cam index may be designed such that shaft rotation may be delayed when pressures exceed a certain amount or at a certain time after firing.

FIG. 5 shows a mechanism 500 including a breech 501 and open chamber cylinder 502 that rotates about an axis (e.g., shaft 505). According to one embodiment, an external rotational drive 504 may be provided, such as an electric motor. Drive 504 may be coupled to a cam assembly 503 which is attached to an open chamber gun mechanism (e.g., open chamber cylinder 502) through shaft 505. According to one embodiment, cam assembly 503 may be constructed such that a short dwell time (e.g., 5-10 ms or other appropriate delay based on rotational speed of the shaft) may be introduced to the open chamber cylinder 502 during its firing cycle (e.g., when an open chamber is in firing position).

A typical firing cycle includes loading a round (e.g., round 400 illustrated in FIG. 4A) into an open chamber (e.g., cavity 308 illustrated in FIG. 3), positioning and firing the round, and then ejecting the spent casing from a cylinder cavity. According to one embodiment of the present invention, a dwell time may be utilized that allows the pressure of the round when fired in battery position to normalize prior to moving the shaft 505 to eject the spent casing. The effect of this delay includes lowering the rotational force necessary to rotate the shaft 505. It is appreciated that such force is lower than what would typically be required to rotate the shaft 505 with a continuous cylinder motion.

According to one embodiment, it appreciated that the dwell time may be adjusted based on the frequency of fire, as well as the time/pressure relationship formed by firing the gun. In one embodiment, the dwell time may start at a time just prior to firing (when pressure is at a minimum) and may end after sufficient time, after the firing of the gun, has lapsed for the pressure within the chamber to dissipate (and therefore permit the cylinder 502 to be rotated more freely). In one embodiment, the dwell time may be within a range of 0.5-1.5 microseconds.

Accordingly, as discussed above, embodiments described herein provide an improved cam mechanism for operating an open chamber mechanism with improved efficiency and reduced power requirements.

Figure 6:
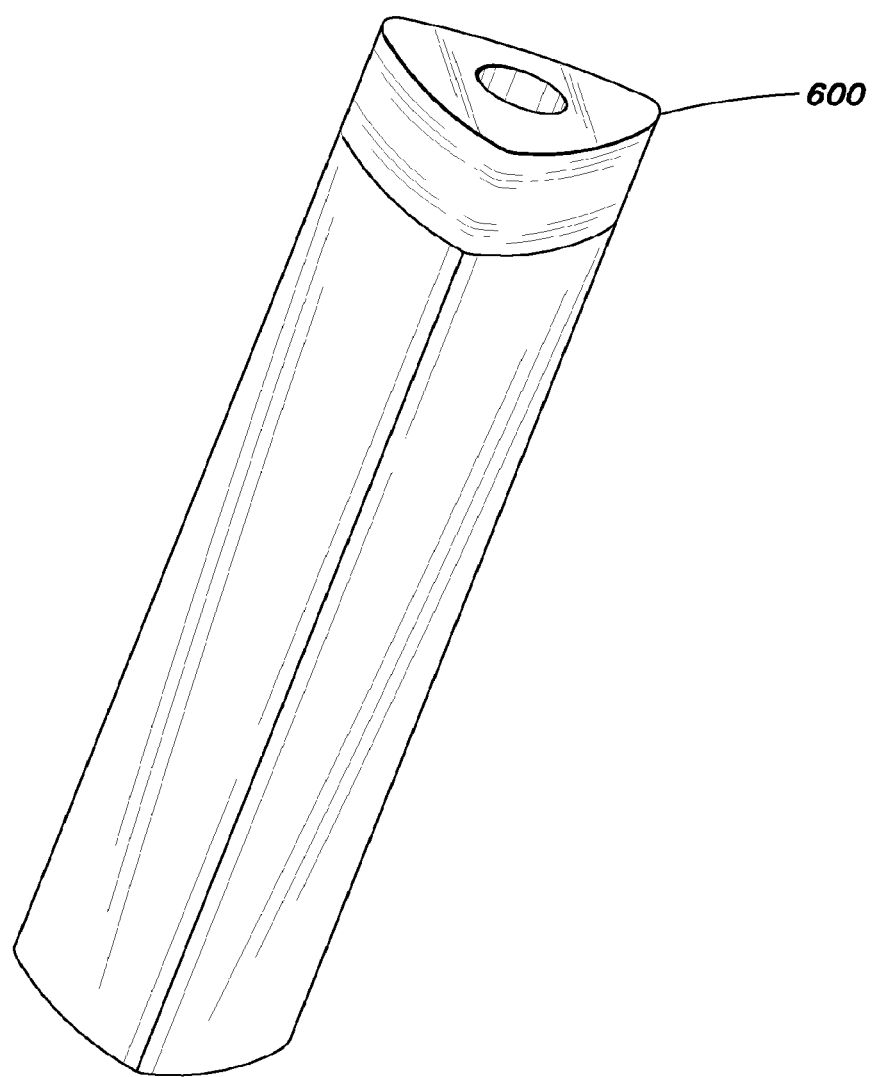
FIG. 6 shows a perspective view of a casing according to one embodiment of the present invention.

FIGS. 6-9 show additional embodiments of a casing design according to various aspects of the present invention. In particular, FIG. 6 shows a perspective view of a casing 600 according to one embodiment of the present invention. FIG. 7 shows a top view of the casing (e.g., casing 600) according to one embodiment of the present invention. Further, FIG. 8 shows a side view of the casing according to one embodiment of the present invention. FIG. 9 shows an end view of the casing according to another embodiment of the present invention.

According to yet another embodiment of the present invention, it is appreciated that the open-chamber mechanism described herein and its ammunition may be used in non-lethal applications (e.g., less than lethal (LTL) applications) such as those that might be used by law enforcement, personal protection and/or military applications where casualty and collateral damage may need to be minimized. In one embodiment, triangular rounds may be provided that include non-lethal projectiles, and such projectiles may be sealed within a plastic triangular cartridge. It should be appreciated that any of the aspects described herein may be applied equally as well with non-lethal projectiles.

In another aspect, these non-lethal projectiles may be provided in a common cartridge format (e.g., a triangular shaped cartridge) whereby different cartridges having different projectile types may be selectively fired within the same gun mechanism. This may be beneficial, as the same guns may be used to fire different types of non-lethal rounds, and therefore, overall cost of the system may be reduced. In yet another implementation, triangular rounds having different projectiles may be loaded selectively by a range finder system, whereby the projectile types are chosen based on an estimated range to the target.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A non-telescoped ammunition round for an open chamber gun mechanism, the round comprising:
    a housing having a triangular shaped cross section and a central longitudinal axis, the housing including:
    at least one projectile positioned along the central longitudinal axis;
    a propellant positioned entirely behind the at least one projectile along the central longitudinal axis;
    a first sealed end located at a first end of the housing nearest the propellant; and
    a second sealed end positioned at a second end of the housing in front of the projectile, wherein the second sealed end is configured to become unsealed after firing of the projectile.

2. The ammunition round according to claim 1, wherein the housing is manufactured using a polycarbonate material.

3. The ammunition round according to claim 1, wherein the second sealed end includes a cover that is attached to the second end of the housing so that, upon firing of the projectile, the projectile exits the housing via the cover.

4. The ammunition round of claim 3, wherein the cover has a thickness configured not to impede a path of the projectile upon firing of the projectile.

5. The ammunition round of claim 3, wherein the housing is manufactured using a polycarbonate material and the cover is manufactured using the polycarbonate material.

6. The ammunition round of claim 3, wherein the cover is configured to shield the projectile and the propellant from being exposed to elements external of the housing.

7. The ammunition round of claim 3, wherein the cover is attached to the second end of the housing with a relatively thin watertight seal.

8. The ammunition round according to claim 1, wherein a firing element is positioned within the first sealed end.

9. The ammunition round according to claim 1, wherein the round further comprises a sealing element disposed around a circumference of the triangular shaped cross section and configured to seal elements along the longitudinal axis of an accepting open cylinder of the ammunition round.

10. The ammunition round according to claim 9, wherein the sealing element is disposed between a plurality of elements that comprise the ammunition round.

11. The ammunition round according to claim 1, wherein the round is configured for use within a non-lethal open chamber gun mechanism.

12. The ammunition round according to claim 1, wherein the triangular shaped cross section includes a symmetrical corner radius at each one of a plurality of edges of the triangular shaped cross section.

13. A method for providing non-telescoped ammunition for an open chamber gun, the method comprising:
    providing at least one housing having a triangular shaped cross section and a central longitudinal axis,
    providing at least one projectile along the central longitudinal axis of the at least one housing;
    providing a propellant entirely between a first end of the projectile and a first sealed end of the at least one housing; and
    providing a second sealed end of the at least one housing adjacent a second end of the projectile, the second sealed end configured to become unsealed upon ignition of the propellant.

14. The method of claim 13, wherein providing at least one housing includes providing at least one housing manufactured with a polycarbonate material.

15. The method of claim 13, wherein providing a second sealed end includes providing a second sealed end including a cover attached to the at least one housing so that, upon ignition of the propellant, the projectile exits the at least one housing via the cover.

16. The method of claim 15, wherein providing a second sealed end including a cover includes providing a second sealed end including a cover having a thickness configured not to impede a path of the projectile upon ignition of the propellant.

17. The method of claim 15, wherein providing at least one housing includes providing at least one housing manufactured with a polycarbonate material and wherein providing a second sealed end including a cover includes providing a second sealed end including a cover manufactured with the polycarbonate material.

18. The method of claim 13, further comprising providing a firing element positioned within the first sealed end of the at least one housing.

19. The method of claim 13, further comprising providing a sealing element disposed around a circumference of the triangular shaped cross section and to seal elements along the longitudinal axis of an accepting open cylinder of the ammunition round.

20. The method of claim 13, wherein providing at least one housing having a triangular shaped cross section includes providing at least one housing having a triangular shaped cross section that includes a symmetrical corner radius at each one of a plurality of edges of the triangular shaped cross section.

* * * * *